United States Patent [19]

Adair

[11] 4,227,562
[45] Oct. 14, 1980

[54] ROAD TRACTION APPARATUS

[76] Inventor: Reginald J. Adair, P.O. Box 126, Utica, Mich. 48087

[21] Appl. No.: 20,084

[22] Filed: Mar. 13, 1979

[51] Int. Cl.³ .............................................. B60C 27/00
[52] U.S. Cl. ................... 152/214; 152/223; 152/233; 180/9.2 C; 180/9.28; 188/4 R; 188/4 B; 238/14
[58] Field of Search ............... 152/208, 213 R, 213 A, 152/214, 223, 224, 233, 239, 241, 185, 185.1; 238/10 R, 14; 180/9, 9.2 R, 9.2 C, 9.26, 9.28; 305/6, 7; 301/40 R, 38 R, 42; 188/4 R, 4 B, 5–6

[56] References Cited

U.S. PATENT DOCUMENTS

| | | | |
|---|---|---|---|
| 2,204,921 | 6/1940 | Becht | 188/4 R |
| 3,428,151 | 2/1969 | Franklin | 188/4 B |

*Primary Examiner*—William A. Powell
*Assistant Examiner*—Thomas Bokan

*Attorney, Agent, or Firm*—William T. Sevald

[57] ABSTRACT

Vehicular road traction apparatus feeds a traction portion of an endless chain between a tire and the road surface and a recirculating portion of the chain is picked up aft of the tire and fed into a conduit which conducts it back to a point fore of the tire where it is fed continuously under the tire as the traction portion. The conduit is supported in position by arms and pivot pins so that the conduit may be moved between the aforesaid feeding position to a non-feeding position where the chain is held away from the tire. A cable moves the conduit between the two positions. The conduit may be hinged midway in its length so as to move its feeding and pickup ends farther apart to stretch the chain taut in the non-feeding position. The conduit may be located outside or inside the tire. When located inside the tire, a skid plate and guide bar assist the supporting means to locate the feeding end of the conduit in proper feeding position.

3 Claims, 6 Drawing Figures

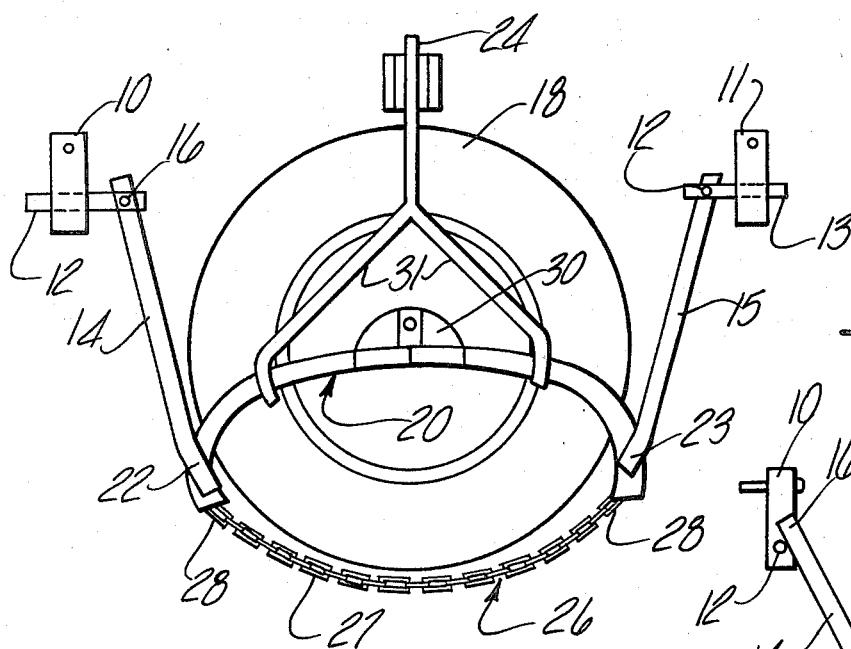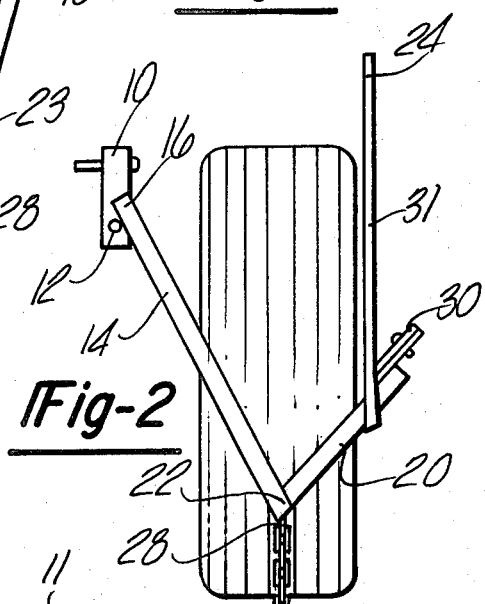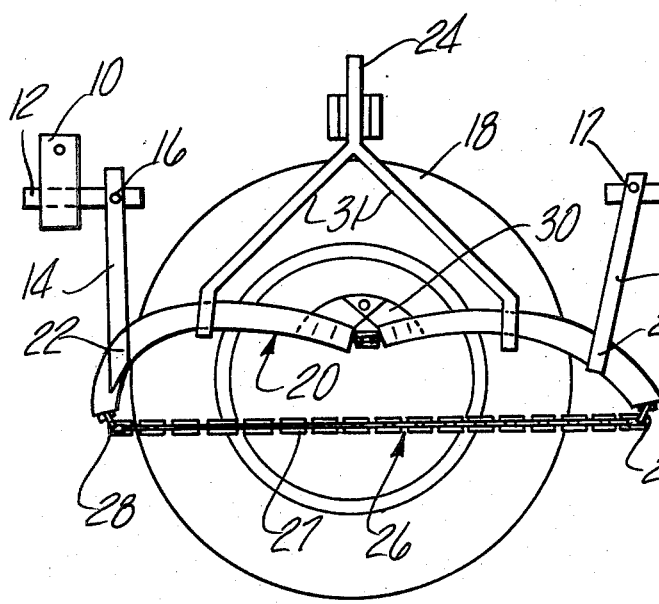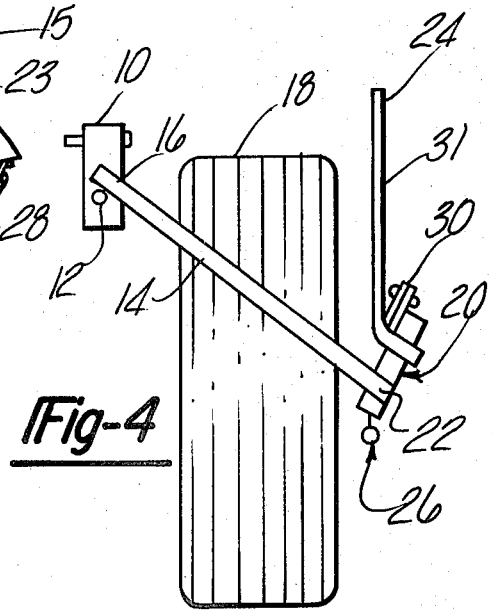

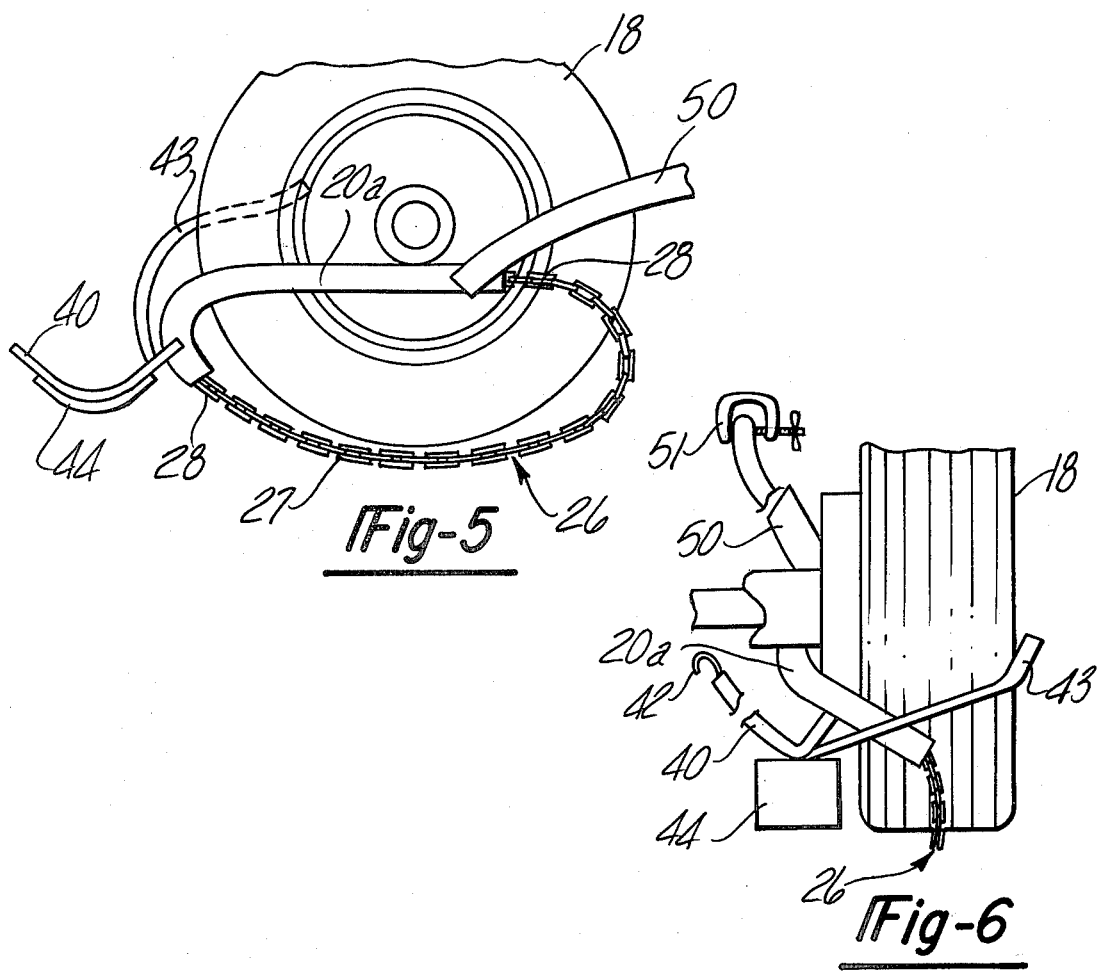

ROAD TRACTION APPARATUS

BACKGROUND OF THE INVENTION

Lack of traction for mobility and for stopping on slick and ice covered pavements has plagued motorists in spite of snow and rain tires. For example, with the freezing rain encountered in the winter of '78—'79, inter alia, four hundred expensive "minor" accidents and about one hundred more serious accidents occurred according to the claim file of one insurance company* during one week in January, 1979, in Grand Rapids, Mich. One "minor" accident caused $600.00 in damage to the rear of one car when hit by a van which could not stop because of the frozen rain on the pavement. Also calls for tow trucks swamp garages and service stations because of cars which can't move on the slick and ice covered pavements.

*AllState

Conventional chains are recognized as a medium which produces starting and stopping traction, but due to the fact that they are difficult to put on, they are not used by the vast majority of motorists. Also with the squeeze for room in the later car models with the inside larger and the outside smaller, there is no room between the tires and the wheel housing to allow the conventional chains to by-pass.

SUMMARY OF THE PRESENT INVENTION

The present invention provides a traction chain apparatus which is easily attachable to a vehicle with either a quickly attachable and detachable mounting with a single traction position or a mounting which is fixedly attached and which has an optional traction position and a non-use storage position so that the driver need only to extend a cable to put the chains under the tires and to retract a cable to move them to the storage position. The apparati, as far as the chain laying is concerned, are substantially the same with only the mountings differing between the "get out and get under" quick mount type and the more convenient fixed mount type.

An arcuate conduit leads from a point adjacent the aft portion of the tire near the road to a point adjacent the fore portion of the tire near the road. An endless chain is threaded through the conduit and in the use position lies between the tire and the road. Rotary motion of the tire over the chain causes the chain to circulate through the conduit with a traction portion lying under the tire and a recirculating portion running through the conduit.

In the quick type mounting, an arm and hook are a suitable attachment forward and a C-clamp rearwardly to hold the conduit in position. In the fixed type mounting, pivot pins and swing arms support the conduit and a cable operated by the driver swings the conduit between the raised position of non-use and the lowered position of use.

The structures embodying the invention and its operation will be more apparent from the accompanying drawing and the later detailed description of the exemplary embodiments shown.

DESCRIPTION OF THE DRAWING

FIG. 1 is a side face elevational view of wheel and tire equipped with the fixed mounting in the use position showing the pivot pins and bearings attachable to the car frame, the swing arms leading from the pins to the conduit, the conduit welded to the arms, a cable for raising and lowering the conduit between the use and non-use position, a hinged joint in the conduit, and a chain having a recirculating portion threaded through the conduit and a traction portion lying beneath the tire.

FIG. 2 is a fore end elevational view of the apparatus seen in FIG. 1.

FIG. 3 is a view similar to FIG. 1 showing the apparatus in the non-use position with the conduit raised, swung outwardly of the tire, and expanded via the hinged joint to pick up slack in the chain.

FIG. 4 is a view similar to FIG. 2 showing the apparatus in the non-use position of FIG. 3.

FIG. 5 is a side elevational view as seen from under a vehicle of a wheel and tire equipped with the quick mounting showing a leg attachable fore of the tire, a leg attachable aft of the tire, a ground skid plate and a tire guide bar attachable to the fore leg for locating the conduit relative to the tire with the chain threaded through the conduit and lying beneath the tire and showing the legs broken away; and FIG. 6 is an end elevational view of the apparatus seen in FIG. 5 with the legs foreshortened and in addition to FIG. 5 showing a hook on the foreleg and a clamp on the aft leg for frame attachment.

DETAILED DESCRIPTION OF THE ILLUSTRATED EMBODIMENTS

Referring now to the drawing wherein like reference numerals refer to like and corresponding parts throughout the several views, the novel vehicular Road Traction Apparatus disclosed therein to illustrate the invention comprises, FIGS. 1—4, bearings 10 and 11 mountable on the frame or underbody of a vehicle, not shown. Pivot pins 12 and 13 lie in the bearings 10 and 11 respectively. Arms 14 and 15 are pivotally connected at a first end to the pins 12 and 13 respectively at 16 and 17. The device so far described lies on either side of the tire 18.

An arcuate conduit 20 has fore and aft ends welded or otherwise secured to second ends of the arms 14 and 15 at 22 and 23 respectively. A cable 24 is attached to the conduit 20 for raising and lowering it. A chain 26 is threaded through the conduit 20 and has a traction portion 27 underlying the tire 18 and a recirculating portion 28 leading to, from, and through the conduit 20.

The conduit 20 may be separate midway and interconnected by a hinged joint 30. The cable 24 may be attached to the conduit 20 via a Y-section 31 or may be attached in a straight line to the hinged joint 30 or to the conduit 20 at one side of the hinged joint 30. In the latter attachment, cable 24 action is transferred from the hinged joint 30 to both portions of the conduit or from one portion of the conduit 20 to the other portion via the hinged joint 30.

Referring now to FIGS. 5 and 6, the conduit 20A is shown foreshortened but may be of any desired length. A leg 40 is welded to the conduit 20A and extends forwardly. A hook 42 on the end of the leg 40 engages a frame or underbody member (not shown) forward of the tire 18. A guide bar 43 and a skid plate 44 are welded to the leg 40. The skid plate 44 rides on the road surface and the guide bar 43 slidably engages the side wall of the tire 18. A leg 50 is welded to the conduit 20A and extends rearwardly. A clamp 51 at the end of the leg 50 secures the extending end of the leg 50 to a frame or underbody member, not shown.

OPERATION OF THE ILLUSTRATED EMBODIMENTS

(Fixed Model—FIGS. 1 to 4)

The apparatus is moved from the position seen in FIGS. 1 and 2 to the position seen in FIGS. 3 and 4 by withdrawing the cable 24 which lifts the conduit 20 as swung on the arms 14 and 15 which removes the traction portion 27 of the chain 26 from under the tire 18 and elevates it to a position sidewardly outwardly of the tire 18. The hinged joint 30 swings open extending the conduit endwise outwardly stretching the chain to a taut condition between the fore and aft ends of the conduit 20.

The apparatus is moved to the position seen in FIGS. 1 and 2 from the position seen in FIGS. 3 and 4 by extending the cable 24 which lets the conduit 20 drop as swung on the arms 14 and 15 allowing the traction portion 27 of the chain 26 to be fed under the tire 18 from the lowered position of the conduit whose ends are now fore and aft of the center of the tire 18.

(Quick Model—FIGS. 5 and 6)

When slick or icy road conditions exist, the driver, service station attendant, or garageman rests the skid plate 44 on the pavement, places the conduit 20a back of the tire 18, locates the guide bar 43 on the outside wall of the tire 18, engages the hook 42 on a frame or body member, and screws down the clamp 51 on a frame or body member, not shown.

(Both Models)

In both models, forward motion of the vehicle and rotation of the tire 18 rolls over the chain 26 so that it lies between the tire 18 and the pavement. In the fixed model rearward motion of the vehicle and rotaton of the tire 18 also rolls the tire 18 over the chain 26.

FIGS. 1 to 4 show the permanently attached or "fixed" model lying outwardly of the tire and FIGS. 5 and 6 show the non-permanently attached or "quick" model lying inwardly of the tire. This discloses that both models may be engineered to lie on either side of the tire as desired.

The embodiments shown and described are illustrative of the invention and the protective scope of the invention is defined in the appended claims.

I claim:

1. Vehicular road traction apparatus for feeding an anti-skid element between a tire of the vehicle and the surface of the road comprising, an anti-skid endless chain having a traction section for lying between a tire and the road and a recirculating section leading from aft of the tire to fore of the tire;

an arcuate tubular conduit leading from aft of the tire to fore of the tire movably enclosing and conducting said recirculating section of said chain from a point aft of a tire to a point fore of a tire;

means for supporting said conduit in position;

rotation of the tire over the traction section of said chain pulling said chain traction section from the conduit at a point fore of rotation of the tire with the movement of said traction section pulling said chain recirculating section through said conduit from a point aft of the tire;

said supporting means including a first pivot pin mountable on a vehicle adjacent a tire;

an arm having an end movably swung on said first pivot pin and an end fixed to said conduit;

a second pivot pin mountable on a vehicle adjacent a tire, a second arm having an end movably swung on said second pivot pin and an end fixed to said conduit;

said first and second arms being fixed to said conduit at points spaced apart;

a cable connected to said conduit for raising said conduit from the position between a tire and the road to a position away from a tire where said chain is not fed under the tire and for lowerng said conduit to the position where said chain is fed under the tire;

said conduit being separated mid-way in its length and a hinged joint interconnecting said separated portions of said conduit;

said cable being attached to said conduit on one side of said hinged joint with the hinged joint transferring raising and lowering motion from said cable to the conduit on the other side of said hinged joint.

2. In an apparatus as set forth in claim 1, said cable being attached to said conduit on both sides of said hinged joint.

3. Vehicular road traction apparatus for feedng an anti-skid element between a tire of the vehicle and the surface of the road comprising, an anti-skid endless chain having a traction section for lying between a tire and the road and a recirculating section leading from aft of the tire to fore of the tire;

an arcuate tubular conduit leading from aft of the tire to fore of the tire movably enclosing and conducting said recirculating section of said chain from a point aft of a tire to a point fore of a tire;

means for supporting said conduit in position;

rotation of the tire over the traction section of said chain pulling said chain traction section from the conduit at a point fore of rotation of the tire with the movement of said traction section pulling said chain recirculating section through said conduit from a point aft of the tire;

said supporting means including a first leg and attaching means for attaching said conduit to a vehicle fore of the tire, a second leg and attaching means for attaching said conduit to a vehicle aft of the tire, a skid plate on said first leg for riding on the road surface fore of the tire spacing said conduit above the road surface fore of the tire, and a guide bar extending from said first leg having an outer end slidably engaging the side wall of the tire to hold said conduit in position to feed said chain under the tire.

* * * * *